US009440190B2

(12) United States Patent
Gale

(10) Patent No.: US 9,440,190 B2
(45) Date of Patent: Sep. 13, 2016

(54) HIGH TEMPERATURE SORBENTS FOR POLLUTION CONTROL

(71) Applicant: Novinda Corporation, Denver, CO (US)

(72) Inventor: Thomas K. Gale, Highlands Ranch, CO (US)

(73) Assignee: Novinda Corp., Denver, CO (US)

( * ) Notice: Subject to any disclaimer, the term of this patent is extended or adjusted under 35 U.S.C. 154(b) by 4 days.

(21) Appl. No.: 14/607,406

(22) Filed: Jan. 28, 2015

(65) Prior Publication Data
US 2015/0224445 A1  Aug. 13, 2015

Related U.S. Application Data

(60) Provisional application No. 61/937,118, filed on Feb. 7, 2014.

(51) Int. Cl.
*B01J 20/04* (2006.01)
*B01J 20/12* (2006.01)
*B01J 20/16* (2006.01)
*B01D 53/34* (2006.01)
*B01D 53/64* (2006.01)
*B01D 53/68* (2006.01)
*B01D 53/46* (2006.01)
*B01D 53/02* (2006.01)
*B01D 53/81* (2006.01)

(52) U.S. Cl.
CPC ............ *B01D 53/685* (2013.01); *B01D 53/02* (2013.01); *B01D 53/46* (2013.01); *B01D 53/64* (2013.01); *B01D 53/81* (2013.01); *B01J 20/043* (2013.01); *B01J 20/12* (2013.01); *B01J 20/16* (2013.01); *B01D 2253/106* (2013.01); *B01D 2253/11* (2013.01); *B01D 2253/112* (2013.01); *B01D 2257/202* (2013.01); *B01D 2257/60* (2013.01); *B01D 2258/0283* (2013.01)

(58) Field of Classification Search
CPC ...... B01J 20/04; B01J 20/041; B01J 20/043; B01J 20/12; B01J 20/16; B01D 53/34; B01D 53/64
See application file for complete search history.

(56) References Cited

U.S. PATENT DOCUMENTS

| 4,387,653 A * | 6/1983 | Voss ................. B01D 53/508 110/342 |
| 4,440,867 A * | 4/1984 | Sabherwal ............ B01J 20/10 210/660 |
| 5,160,715 A * | 11/1992 | Pinnavaia ............ B01D 53/508 423/244.08 |
| 5,619,937 A * | 4/1997 | Linak ................. B01D 53/64 110/345 |
| 6,627,083 B2 * | 9/2003 | Rennesund ............. B01J 20/12 210/660 |
| 6,974,564 B2 * | 12/2005 | Biermann ............ B01D 53/02 423/210 |
| 2008/0028932 A1 * | 2/2008 | Biermann ............ B01D 53/02 95/134 |
| 2011/0079543 A1 * | 4/2011 | Willis ................ C10G 11/02 208/119 |
| 2011/0230334 A1 * | 9/2011 | Goldberg ............ B01D 53/508 502/74 |

FOREIGN PATENT DOCUMENTS

BR  PI0908786 A2 *  7/2015  .......... A01K 1/0154
JP  2015150538 A *  8/2015  .......... B01D 53/14

OTHER PUBLICATIONS

Dojkov, I. et al., "On the Consumption of Lime by MetaKaolin, Fly Ash and Kaoline in Model Systems" J.Chem.Tech.Metal., 2013, 48-1, 54-60.
Gale, T. and Walsh, P.M. "Trace-Metal Scavenging from Biomass Syngas with Novel High-Temperature Sorbents" US Dept. of Energy, 2007.
Gale, T. and Wendt, J.O.L., "Mechanisms and Models Describing Sodium and Lead Scavenging by Kailinite Aerosol at High Temperatures" Aerosol Sci.Tech., 2003, 37, 865-876.
Nalbandian, H., "Trace element emissions from coal" IEA Clean Coal Center, Nov. 2012.

* cited by examiner

*Primary Examiner* — Timothy Vanoy
(74) *Attorney, Agent, or Firm* — Synthesis Intellectual Property LLC

(57) ABSTRACT

Herein are described products and processes for the reduction of contaminants from flue gases. Product compositions can include an aluminosilicate; and a calcium compound selected from calcium oxide, calcium hydroxide, calcium carbonate, calcium halide, PRB coal fly ash, and a mixture thereof. Processes can include injecting a sorbent composition into a flue gas at a location where the flue gas has a temperature in a range of about 1700° C. to about 400° C., admixing the sorbent composition and a contaminant to form a eutectic composition; and collecting the eutectic composition at a temperature in a range of about 400° C. and about 50° C. Other product compositions can include a combination of anti-eutectic and non-eutectic materials.

17 Claims, No Drawings

HIGH TEMPERATURE SORBENTS FOR POLLUTION CONTROL

CROSS-REFERENCE TO RELATED APPLICATIONS

This disclosure claims the benefit of priority to U.S. Provisional Patent Application No. 61/937,118 filed Feb. 7, 2014, which is incorporated herein in its entirety.

FIELD OF THE INVENTION

This disclosure is directed to compositions and processes for decontamination of flue gases. Specifically, the reduction of toxic contaminants from flue gas produced by coal combustion.

BACKGROUND

Combustion of coal is a potential source of toxic emissions to the atmosphere, including heavy metals. Combustion processes are considered the most important sources of heavy-metal pollutants to the atmosphere—particularly power generation, smelting, and incineration. It is important that emissions of potentially toxic air pollutants from coal combustion and biomass are measured and, if necessary, controlled in order to limit any deleterious environmental effects. Increasing concern about the effects of trace pollutants in the environment has led to the introduction of emission standards for some of these pollutants.

Coal, as the most abundant fossil fuel, accounts for ~40% of the electricity produced throughout the world. Coal-fired power plants release to the environment $SO_2$ and $NO_x$, as well as $CO_2$ and $N_2O$, particulate matter, mercury (Hg) and other pollutants such as cadmium (Cd), arsenic (As), molybdenum (Mo), vanadium (V) and various acid gases. Average values for trace-metal contaminants in coal range from about 0.093 mg/kg for Cadmium to 47 mg/kg for Boron.

The US National Research Council (NRC) classified contaminants from coal based on adverse health effects and abundances in coal. As major concern, the NRC listed arsenic, boron, cadmium, lead, mercury, molybdenum and selenium, where arsenic, cadmium, lead and mercury are toxic to most biological systems. Additional concern was directed to chromium, vanadium, copper, zinc, nickel and fluorine.

SUMMARY

A first embodiment is a sorbent composition that includes an aluminosilicate; and a calcium compound selected from calcium oxide, calcium hydroxide, calcium carbonate, calcium halide, PRB coal fly ash, and a mixture thereof.

A second embodiment is a process of reducing contaminant concentrations in flue gas, the process including injecting a sorbent composition into a flue gas at a location where the flue gas has a temperature in a range of about 1700° C. to about 400° C.; admixing the sorbent composition and a contaminant to form a eutectic composition; and collecting the eutectic composition at a temperature in a range of about 400° C. and about 50° C.

A third embodiment is sorbent composition that includes an ante-eutectic sorbent for a first contaminant selected from the group consisting of selenium, arsenic, boron, phosphorous, potassium, sodium, cadmium, lead, molybdenum, chromium, vanadium, copper, zinc, nickel, fluorine, barium, strontium, manganese, cobalt, antimony, lithium, chlorine, bromine, and germanium; and a non-eutectic sorbent for a deactivating contaminant.

DETAILED DESCRIPTION

Herein are described embodiments of compositions and processes for reducing non-mercury contaminant concentrations in flue gas produced, for example, during the combustion of coal.

A first embodiment is a sorbent composition that includes an aluminosilicate; and a calcium compound selected from calcium oxide, calcium hydroxide, calcium carbonate, calcium halide, and a mixture thereof. In one example of this embodiment, the sorbent composition can consist essentially of, or consist of the aluminosilicate and the calcium compound. In one instance the sorbent composition is an aluminosilicate carrying the calcium compound; in another instance the sorbent composition is a physical admixture of the aluminosilicate and the calcium compound. When the sorbent composition is a physical admixture of the aluminosilicate and the calcium compound, the aluminosilicate and the calcium compound can be present as individual particulates, preferably, having similar or the same particulate size. In still another instance, the sorbent composition can be a core-shell material where one of the aluminosilicate and calcium compound forms a shell about the other. In yet another instance, the sorbent composition can include layers of the aluminosilicate and the calcium compound. Notably, the manufacture of the sorbent composition may employ solvents, these solvents are, preferably, not included in the composition or, if included, are contained in an amount of less than about 15 wt. %, 10 wt. %, 5 wt. %, or 1 wt. %. As will become clear from discussions of the processes for reducing non-mercury contaminant concentrations, the inclusion of solvents in the sorbent composition may be undesirable due to the rapid/flash vaporization of the solvent during the process. Alternatively, a small amount of the solvent can assist in the formation of sorbent sites in the sorbent composition during the process and therefore the sorbent composition may include a volatile component (e.g., a solvent) in a concentration of less than about 25 wt. %, 20 wt. %, 15 wt. %, 10 wt. %, or 5 wt. %.

The sorbent composition can include about 5-95 wt. % of the aluminosilicate and 5-95 wt. % of the calcium compound. In one example, the sorbent composition includes about 10 wt. %, 20 wt. %, 30 wt. %, 40 wt. %, 50 wt. %, 60 wt. %, 70 wt. %, 80 wt. %, or 90 wt. % of the aluminosilicate with the balance consisting essentially of the calcium compound. In another example, the sorbent composition includes at least 10 wt. %, 20 wt. %, 30 wt. %, 40 wt. %, 50 wt. %, 60 wt. %, 70 wt. %, 80 wt. %, or 90 wt. % of the aluminosilicate with the balance consisting essentially of the calcium compound. In still another example, the composition can include about 50-95 wt. % of the aluminosilicate and about 5-50 wt. % of the calcium compound.

The calcium compound can be a calcium oxide, calcium hydroxide, calcium carbonate, calcium halide, or a mixture thereof. Specific examples of applicable calcium compounds include limestone, lime, hydrated lime, quick lime, $CaCO_3$, $Ca(HCO_3)_2$, CaO, $Ca(OH)_2$, and PRB coal fly ash. Preferably, where the PRB coal fly ash has a unburned carbon (UBC) of less than about 1 wt. %, preferable less than 0.3 wt. %.

The aluminosilicate can have an Al:Si ratio of about 4:1 to about 1:4. For example the aluminosilicate can be an andalusite, kyanaite, sillimanite, kaolinite, metakaolinite, mullite, synthetic aluminosilicate or a mixture thereof. In one preferable example, the aluminosilicate is kaolinite. The aluminosilicate can be the product of a recycling process, that is, the aluminosilicate can be a recycled product. In one example, the aluminosilicate is a paper recycling product, for example, the aluminosilicate is a side-product from the recycling of magazine paper.

The sorbent composition is preferably an ante-eutectic composition. As used herein, ante-eutectic means that the composition can react with a flue gas contaminant to form a eutectic composition. As used herein, a eutectic composition is a material that has a melting point below that of the ante-eutectic composition. That is, the ante-eutectic composition is a solid composition that can react with a flue gas contaminant to form a eutectic composition at a temperature in the range of about 1700° C. to about 400° C. or at the flue-gas temperature in a location between the combustion zone and the heat exchanger in a coal-fired boiler. The formation of a liquid-eutectic composition can be transitive and the eutectic composition can "freeze" due to any one of the following processes: cooling, dilution, or recrystallization.

In one example, the composition can be ante-eutectic for selenium in a temperature range of about 1700° C. to about 400° C. That is, the solid, ante-eutectic composition when mixed with selenium, in the temperature range, forms a eutectic composition. In another example, the composition can be ante-eutectic for arsenic in a temperature range of about 1700° C. to about 400° C. In still another example, the composition can be ante-eutectic for phosphorous in a temperature range of about 1700° C. to about 400° C. In yet another example, the composition can be ante-eutectic for a transition metal in a temperature range of about 1700° C. to about 400° C.; wherein the transition metal is selected from the group consisting of cadmium, cobalt, lead, chromium, copper, nickel, zinc, and a mixture thereof.

Another embodiment is a process of reducing contaminant concentrations in flue gas. This process can include injecting a sorbent composition, described above, into a flue gas at a location where the flue gas has a temperature in a range of about 1700° C. to about 400° C.; admixing the sorbent composition and a contaminant to form a eutectic composition; and then collecting the eutectic composition at a temperature in a range of about 400° C. and about 50° C. In one example, the injection of the sorbent composition is upstream of an SCR Catalyst system and thereby provides increased life to the SCR catalyst.

The contaminant is, preferably, selected from the group consisting of selenium, arsenic, boron, phosphorous, potassium, sodium, cadmium, lead, molybdenum, chromium, vanadium, copper, zinc, nickel, fluorine, barium, strontium, manganese, cobalt, antimony, lithium, chlorine, bromine, germanium, and a mixture thereof. The contaminant may be a cation, an anion, or a neutral ($M^o$) atom. In one example, the contaminant is selected from the group consisting of arsenic, cadmium, lead, and a mixture thereof. In another example, the contaminant is selenium; and the admixing of the sorbent composition and selenium includes reacting the sorbent composition with selenium before it converts to selenate.

In still another example, the process can include injecting a plurality of sorbent compositions into the flue gas. This example includes a first sorbent composition that is an ante-eutectic composition for a first contaminant selected from the group consisting of selenium, arsenic, boron, phosphorous, potassium, sodium, cadmium, lead, molybdenum, chromium, vanadium, copper, zinc, nickel, fluorine, barium, strontium, manganese, cobalt, antimony, lithium, chlorine, bromine, and germanium; admixing the first sorbent composition and the first contaminant to form an eutectic composition; and collecting the eutectic composition at a temperature in a range of about 400° C. and about 50° C.

In one instance, the plurality of sorbent compositions includes a second sorbent composition that is an ante-eutectic composition for a second contaminant selected from the group consisting of selenium, arsenic, boron, phosphorous, potassium, sodium, cadmium, lead, molybdenum, chromium, vanadium, copper, zinc, nickel, fluorine, barium, strontium, manganese, cobalt, antimony, lithium, chlorine, bromine, and germanium; wherein admixing includes admixing the second sorbent composition and second contaminant to form a second eutectic composition; and wherein collecting includes collecting the second eutectic composition. In another instance, the plurality of sorbent compositions includes a second sorbent composition which is a non-eutectic composition. That is, the second sorbent composition forms a sorbed composition that is not eutectic. The sorbed composition is preferably with a contaminant selected from arsenic and cadmium. In still another instance, the plurality of sorbents compositions includes a first sorbent composition which is an ante-eutectic for selenium; and wherein the process includes collecting the eutectic composition formed from the first sorbent composition and selenium.

In still another embodiment, the sorbent composition can be a combination of an ante-eutectic sorbent and a non-eutectic sorbent. That is, the sorbent composition can include, can consist essentially of, or can consist of an ante-eutectic sorbent and a non-eutectic sorbent.

The ante-eutectic sorbent can be ante-eutectic for a first contaminant selected from the group consisting of selenium, arsenic, boron, phosphorous, potassium, sodium, cadmium, lead, molybdenum, chromium, vanadium, copper, zinc, nickel, fluorine, barium, strontium, manganese, cobalt, antimony, lithium, chlorine, bromine, and germanium.

In one instance, the non-eutectic sorbent protects the ante-eutectic sorbent from deactivation. For example, the non-eutectic sorbent can react with but not form a eutectic upon sorption of a deactivating contaminant. That is, the non-eutectic sorbent can protect the ante-eutectic by reacting with a deactivating component. In one example, this protection keeps a portion, preferably the majority, of the ante-eutectic active for effective capture of eutectic-forming contaminant(s). Herein, a deactivating contaminant is a particular trace metal which would otherwise react with the ante-eutectic to form a lower-temperature eutectic than the desired contaminant to be captured (e.g., the first contaminant), thereby, the deactivating contaminant reduces the effective capture of the first contaminant by chemically altering the ante-eutectic and providing a product with the ante-eutectic that is less effective for capture of the desired (e.g., first) contaminant. The non-eutectic portion of the composition can, therefore, protect the ante-eutectic portion of the sorbent particles and allow the ante-eutectic to remain available and active for capturing other metals. This protection of the ante-eutectic by the non-eutectic can occur by both alleviating the competition for active sites by other trace-metal constituents and by preventing deactivation of the ante-eutectic by preventing the formation of contaminant-fee eutectics.

In another instance, the non-eutectic sorbent can be effective for capture of the first contaminant (i.e., the contaminant sorbed by the ante-eutectic). In this instance, the combination of the ante-eutectic with the non-eutectic enhances the total amount of contaminant capture.

This sorbent composition can include a physical admixture of the ante-eutectic and non-eutectic sorbents. Preferably, the sorbent composition includes a particulate blend of the ante-eutectic and the non-eutectic sorbents. Alternatively, the sorbent composition can include a core/shell particulate that includes the ante-eutectic as the core or shell and the non-eutectic as the other component. Still further the sorbent composition can include an agglomeration of the ante-eutectic and non-eutectic sorbents.

What is claimed:

1. A sorbent composition consisting essentially of:
   an aluminosilicate selected from the group consisting of andalusite, kyanaite, sillimanite, kaolinite, metakaolinite, mullite, and a mixture thereof; and
   a calcium carbonate;
   wherein the sorbent composition is ante-eutectic in a temperature range of about 1700° C. to about 400° C. for selenium, arsenic, phosphorous, or a transition metal selected from the group consisting of cadmium, cobalt, lead, chromium, copper, nickel, zinc, and a mixture thereof.

2. The sorbent composition of claim 1, wherein the composition is a physical admixture of the aluminosilicate and the calcium carbonate.

3. The sorbent composition of claim 1, wherein the aluminosilicate is kaolinite.

4. The sorbent composition of claim 3, wherein the composition comprises about 5-95 wt. % of kaolinite and 5-95 wt. % of the calcium carbonate.

5. The sorbent composition of claim 4, wherein the composition comprises about 50-95 wt. % of kaolinite and 5-50 wt. % of the calcium carbonate.

6. The sorbent composition of claim 1, wherein the calcium carbonate is limestone.

7. A process of reducing a concentration of a contaminant in flue gas, the process comprising:
   injecting a sorbent composition into a flue gas at a location where the flue gas has a temperature in a range of about 1700° C. to about 400° C.;
   admixing the sorbent composition and the contaminant to form a eutectic composition; and
   collecting the eutectic composition at a temperature in a range of about 400° C. and about 50° C.

8. The process of claim 7, wherein the contaminant is selected from the group consisting of selenium, arsenic, boron, phosphorous, potassium, sodium, cadmium, lead, molybdenum, chromium, vanadium, copper, zinc, nickel, fluorine, barium, strontium, manganese, cobalt, antimony, lithium, chlorine, bromine, germanium, and a mixture thereof.

9. The process of claim 7, wherein the contaminant is selenium; and wherein the admixing of the sorbent composition and selenium includes reacting the sorbent composition with selenium before it converts to selenate.

10. The process of claim 7, wherein the process includes:
    injecting a plurality of sorbent compositions into the flue gas, wherein a first sorbent composition is an ante-eutectic composition for a first contaminant selected from the group consisting of selenium, arsenic, boron, phosphorous, potassium, sodium, cadmium, lead, molybdenum, chromium, vanadium, copper, zinc, nickel, fluorine, barium, strontium, manganese, cobalt, antimony, lithium, chlorine, bromine, and germanium;
    admixing the first sorbent composition and the first contaminant to form an eutectic composition;
    collecting the eutectic composition at a temperature in a range of about 400° C. and about 50° C.

11. The process of claim 10, wherein a second sorbent composition is an ante-eutectic composition for a second contaminant selected from the group consisting of selenium, arsenic, boron, phosphorous, potassium, sodium, cadmium, lead, molybdenum, chromium, vanadium, copper, zinc, nickel, fluorine, barium, strontium, manganese, cobalt, antimony, lithium, chlorine, bromine, and germanium; wherein admixing includes admixing the second sorbent composition and second contaminant to form a second eutectic composition; and wherein collecting includes collecting the second eutectic composition.

12. The process of claim 10, wherein a second sorbent composition is a non-eutectic composition; and wherein the second sorbent composition forms a sorbed composition with a contaminant selected from arsenic and cadmium.

13. The process of claim 10, wherein the plurality of sorbent compositions includes a first sorbent composition which is an ante-eutectic for selenium; and wherein the process includes collecting the eutectic composition formed from the first sorbent composition and selenium.

14. The process of claim 7, wherein the sorbent composition consists essentially of:
    an aluminosilicate selected from the group consisting of andalusite, kyanaite, sillimanite, kaolinite, metakaolinite, mullite, and a mixture thereof; and
    a calcium carbonate;
    wherein the sorbent composition is ante-eutectic in a temperature range of about 1700° C. to about 400° C. for selenium, arsenic, phosphorous, or a transition metal selected from the group consisting of cadmium, cobalt, lead, chromium, copper, nickel, zinc, and a mixture thereof.

15. A sorbent composition comprising:
    an ante-eutectic sorbent for a first contaminant selected from the group consisting of selenium, arsenic, boron, phosphorous, potassium, sodium, cadmium, lead, molybdenum, chromium, vanadium, copper, zinc, nickel, fluorine, barium, strontium, manganese, cobalt, antimony, lithium, chlorine, bromine, and germanium; and
    a non-eutectic sorbent.

16. The sorbent composition of claim 15, wherein the non-eutectic sorbent is a sorbent for a deactivating contaminant.

17. The sorbent composition of claim 15, wherein the composition is a particulate blend of the ante-eutectic sorbent and the non-eutectic sorbent.

* * * * *